June 16, 1931.  A. A. SCHAEFER  1,810,405
FRICTION TESTING MACHINE
Filed July 5, 1928   2 Sheets Sheet 1
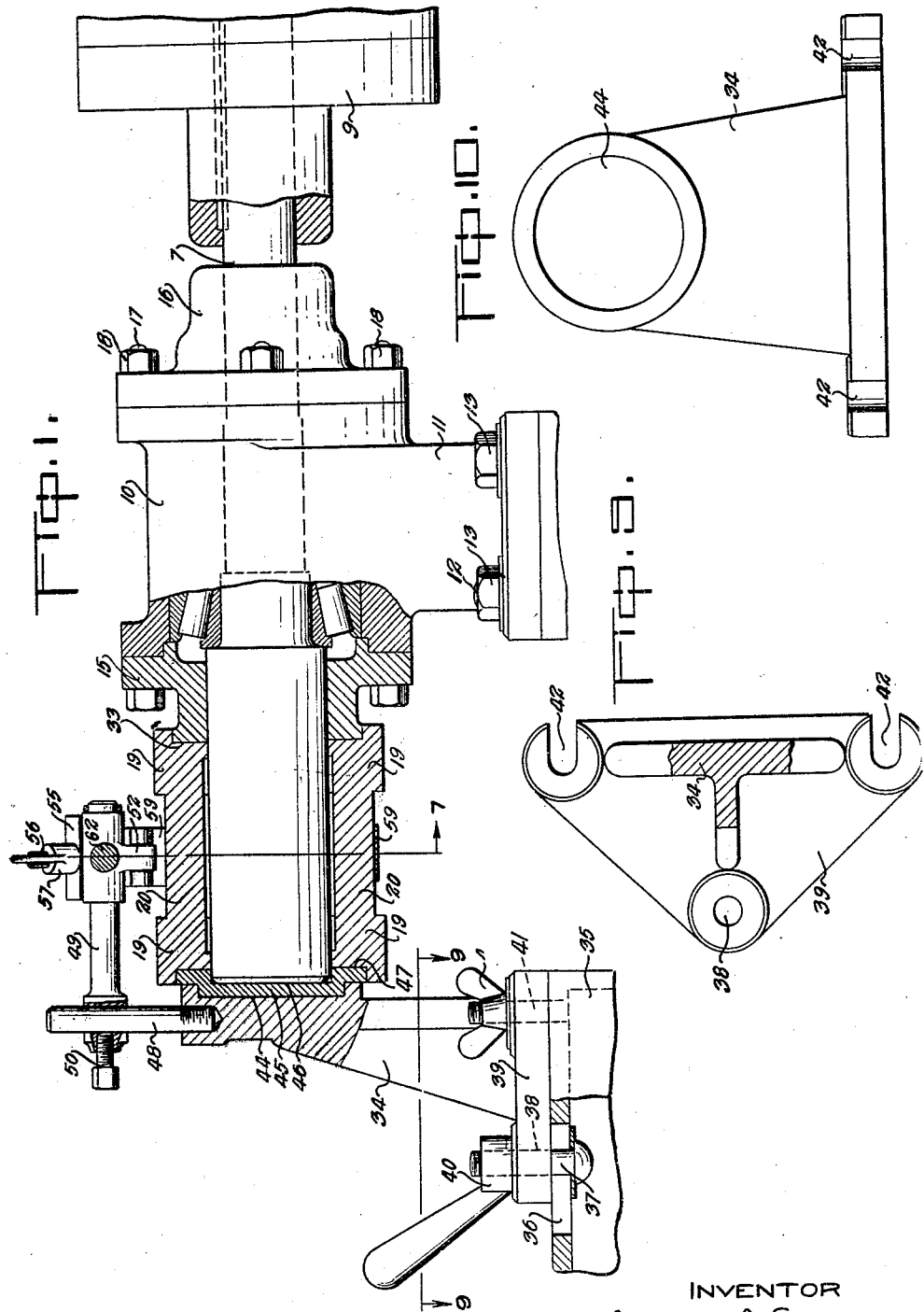
INVENTOR
ADOLPH A. SCHAEFER.

June 16, 1931. A. A. SCHAEFER 1,810,405
FRICTION TESTING MACHINE
Filed July 5, 1928 2 Sheets-Sheet 2
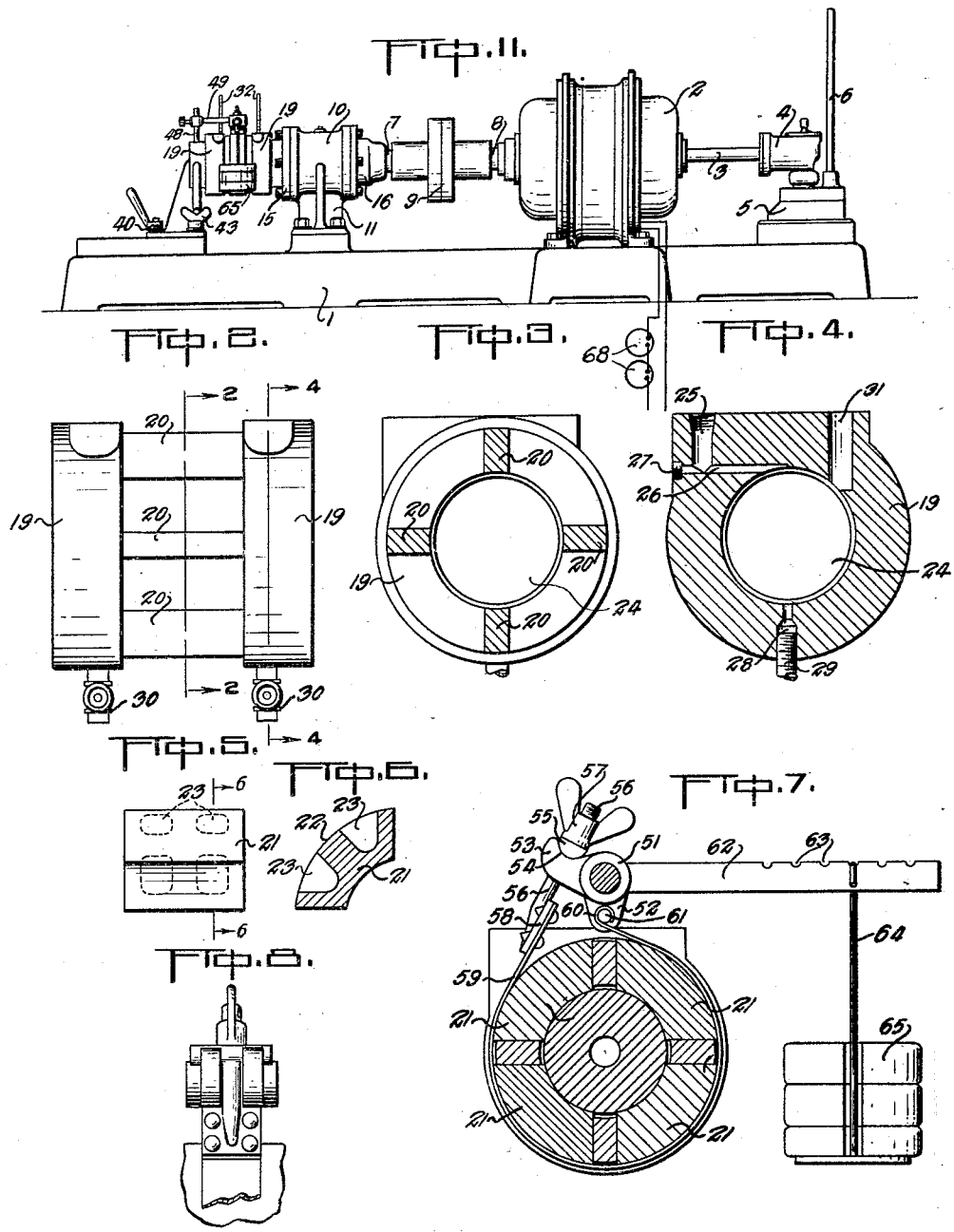
INVENTOR
ADOLPH A. SCHAEFER Patented June 16, 1931

1,810,405

UNITED STATES PATENT OFFICE

ADOLPH ALOYSIUS SCHAEFER, OF NORTH TONAWANDA, NEW YORK

FRICTION TESTING MACHINE

Application filed July 5, 1928. Serial No. 290,606.

My invention relates to improvements in friction testing methods and machines, and the object of the invention is to construct a device which shall be equally applicable for testing lubricants and bearing metals, and another object of the invention is to construct a machine in which the energy required to produce the movement between the test bearing surfaces will be positively and accurately shown.

A further object of the invention is to utilize my machine in my oil testing methods by inserting an oil bearing of a metal sensitive to heat and of which the fusing temperature is definitely known so that the frictional heat resisting and adhesive bearing film qualities of the lubricant under test may be accurately demonstrated.

A still further object of my invention is to construct a machine of this type in which successive tests upon various oils, greases and bearing metals can be made at the minimum of trouble and with great expediency.

My invention consists of a friction testing machine constructed and arranged all as hereinafter more particularly described and illustrated in the accompanying drawings, in which:

Fig. 1 is a fragmentary side elevational view of a portion of my machine, part of such portion being shown in section to disclose the rotated shaft and a sectional view of the frictional bearing which is adapted to surround such shaft.

Fig. 2 is a side elevational view of a frictional bearing cage adapted to receive test bearing blocks.

Fig. 3 is a cross-sectional view taken through the line 3—3 in Fig. 2.

Fig. 4 is a cross-sectional view taken through the line 4—4, Fig. 2.

Fig. 5 is a side elevational view of one of the bearing blocks.

Fig. 6 is a cross-sectional view through block being taken through the line 6—6 Fig. 5.

Fig. 7 is a cross-sectional view through the frictional bearing assembly being taken through the line 7—7 Fig. 1.

Fig. 8 is a side elevational view of the swingable tension means and support therefor, which is used in conjunction with the frictional bearing.

Fig. 9 is a cross-sectional view of the bearing end plate supporting stand, being taken through the line 9—9 Fig. 1.

Fig. 10 is an inner end elevational view of such stand, and

Fig. 11 is a reduced side elevational view of my complete machine assembly.

Like characters of reference indicate corresponding parts in the different views.

My entire assembly is mounted upon a unitary base member 1, and comprises an electric motor 2 of suitable horse power secured upon said base intermediately of its length and provided upon one side with a shaft 3 which extends to a tachometer 4 mounted upon a pedestal 5 which is in turn secured upon base 1. This tachometer is a standard device being furnished with the vertically extending fluid indicating tubes 6.

Upon the one side of the motor 2 and upon the base 1, I position a suitable roller bearing assembly adapted to rotatably support a shaft 7 in alignment with the motor shaft 8, the adjacent ends of such shafts 7 and 8 being connected by means of a standard coupling 9. The bearing assembly consists of a cylindrical housing 10 mounted upon and forming part of a pedestal 11 which is secured by means of suitable studs and bolts 12 and 13 upon the base 1. Interiorly of the housing 10, I furnish a roller bearing assembly 14 which follows standard practice in construction and rotatably supports the shaft 7. Upon the ends of housing 10, I provide end caps 15 and 16 through which, of course, the shaft 7 extends, the cap 15 being suitably faced and dimensioned to enter the adjacent end of the friction bearing assembly as will be hereinafter explained, such caps 15 and 16 being secured to the housing 10 by means of suitable studs and nuts 17 and 18.

My frictional bearing assembly consists of a bearing supporting cage of substantially cylindrical form and comprising a pair of ring end plates 19 connected together by a plurality of equi-distantly spaced apart radially positioned bars 20, lying in parallel relation to the shaft 7, the spaces between such bars being adapted to receive the frictional bearing blocks 21, the outer faces 22 of such blocks being formed with suitable recesses 23 in order to insure the maximum dissipation of the frictional heat generated when the machine is being run.

The end plates 19 contain central orifices 24 through which the shaft 7 freely extends and are each drilled to provide suitable lubricant ducts for both feeding and draining the lubricant away from the bearings. To provide these ducts a downwardly extending orifice 25 is drilled in the upper face of each plate 19 and the upper ends of such orifices are threaded to receive the ends of oil feed pipes which are not shown as they form no part of the invention. Transversely across the plates 19 and forming communications between the orifices 25 and the shaft containing orifices 24, passages 26 are drilled, the outer ends of such passages, of course, being plugged to prevent the escape of the oil. In the lower portion of the plates 19 upwardly extending oil draining orifices 28 are drilled, the upper ends of such orifices communicating with the shaft containing orifices 24 and the lower ends being suitably threaded to receive the threaded ends of the oil drainage pipes 29 which form part of oil drainage valves 30. The plates 19 are also each furnished with a downwardly extending orifice 31 positioned oppositely to the orifice 25 and extending from the upper faces of the plates to the shaft receiving orifices 24 to constitute containers for the reception of thermometers 32 which are used in determining the frictional heat generated in the bearing.

The bearing block receiving cage as described in the preceding paragraph is positioned about the free end of the shaft 7, and the outer face of the inner plate 19 is formed with a suitable recess 33 to receive the outer end of the roller bearing assembly cap 15 as illustrated in Fig. 1. The outer end of the cage structure is supported by a standard 34 which is slidably mounted upon a hollow base 35 forming part of the base 1. To provide this slidable mounting, I furnish a slot 36 centrally of the upper face of the base 36, such slot containing an upwardly extending slidable bolt 37 which projects therethrough and also through an orifice 38 in the base 39 of the pedestal 34, and 40 is a locking handle threaded upon the bolt 37 and bearing against the face of the base 39. A pair of studs 41 are also secured in the base 35 in the vicinity of its inner end and are adapted to project through suitably positioned slots 42 in the ends of the inner edge of the base 39, and 43 are wing nuts threaded upon the upper ends of the studs 41 and adapted to also bear upon the upper face of the base 39. The inner face of the upper end of the pedestal 34 is formed as a circular recess 44 adapted to receive an end bearing plate 45 which is also formed with a recess 46 to receive the end of the shaft 7, the adjacent face of the outer plate 9 of the frictional bearing cage being also formed with a recess 47 to receive the end plate 45.

As before mentioned the bearing blocks 21 are positioned in the cage between the bars 20 and in order to hold these blocks in place and also in pre-determined frictional contact with the shaft 7, I provide the retaining and tensioning structure clearly illustrated in Figs. 1, 7 and 8, and in which 48 is a spindle extending upwardly from the upper end of the pedestal 34 to support a longitudinally extending arm 49 which is mounted thereon by means of an integrally formed ring which is slidably mounted upon spindle 48 and retained in any desired position by means of a set screw 50 which is threaded through such ring and bears against the spindle.

Upon the opposite end of the rod 49 I rotatably mount a collar 51 which is furnished in that portion which normally constitutes its bottom with a radial lug 52, and in obtuse angular relation with the lug 52 a bifurcated lug 53 is formed, the upper face 54 of such lug being concaved to support a semi-cylindrical bar 55 through which a threaded draw bolt 56 freely extends, and furnished upon its upper end with a wing nut 57 which bears against the face of the semi-cylindrical bar.

The lower end of the draw bolt 56 is formed with an integral plate 58 to which is permanently secured one end of a strap 59 which is adapted to surround the blocks 21 in the cage and retain them in position. The other end of the strap 59 is bifurcated for a portion of its length which is turned back to form loops 60, extending around the ends of a bar 61 which projects through the lug 52. Extending outwardly from the collar 51 in a substantially horizontal direction, I furnish an arm 62 provided upon its upper face with spaced apart depressions 63, and 64 is a weight supporting hook adapted to be positioned upon such bar 62 in any of the depressions 63, and so formed to support a plurality of cylindrical slotted weights 65.

The operation of my device is as follows: When it is desired to test the various lubricating qualities of a certain type or brand of lubricant the thumb screw 57 is slackened so that the draw bolt 56 can be slid from the bifurcated member 53 and the strap 59 is removed from around bearing block cage. Suitable bearing blocks 21 are then inserted between the bars 20 so that they bear against the shaft 7 and the strap 59 is again carried around the cage, the draw bolt 56 being inserted in the bifurcated lug 53. The wing nut 57 is then tightened down to a slight degree to hold the strap in position so that suitable weights 65 can be positioned upon the hook 64 which is suspended from the arm 62. The weights 65 will, of course, through the arm 62 tend to swing the sleeve 56 in a clock-wise direction, thus drawing the strap 59 tautly around the bearing blocks and pressing them against the shaft 7. It is to be understood of course that these blocks are so dimensioned in relation to the spaces between the bars 20 that they are capable of being pressed inwardly against the shaft. The lubricant under test is positioned in a suitable container which is in piped connection with the orifices 25 in the plates 19, valves for regulating the oil feed to the orifices 25 also being furnished, neither the pipes nor valves being shown in the drawings as they form no part of the invention or are essential in the disclosure.

The electric motor 2 is then started and the tachometer 4 adjusted to the motor speed. The oil at this time is flowing through the frictional bearing assembly and the strap 59 is so adjusted that there is no bearing pressure between the blocks 21 and the shaft 7. When the machine has been run for a predetermined length of time the testing structure is then so adjusted that bearing pressure is exerted by the blocks 21 on the shaft 7. The supply of oil to the frictional bearing assembly is cut off, and at the same time readings are taken of the electric supply meters 68 to the motor, also of the tachometer and also of the thermometers 32, which have been positioned within the orifices 31 and are bearing against the face of the shaft 7. As the supply of lubricant has been cut off from the frictional bearing, it is now a question of time as to how long the lubricant contained in the bearing will be capable of retaining its lubricating qualities to maintain the friction at a minimum. By carefully watching the electrical supply meters and the thermometers, the time when such lubricant begins to lose its lubricating qualities will be when the temperature begins to rise, R. P. M. of the motor fall, and the amount of electrical energy consumed will increase as the motor pulls against the increased friction of the bearing.

If the lubricant is only under test the machine is stopped as soon as a certain degree of friction is attained, as the time taken in conjunction with the temperature reached and the power consumption of the motor will give all the data necessary in determining the point at which the oil breaks down and allows the coefficient of friction to materially increase. But, however, if it is desired to test the bearing or frictional qualities of the bearing blocks 21, the machine is allowed to run after the oil materially loses its lubricating qualities and the bearing has increased in temperature and the revolutions of the motor slowed down. It will be understood that in the case of white metal, self-lubricating or other bearing alloys, that if a certain temperature is reached, that the melting point of the metal will be attained and bearing run, which will of course immediately remove the friction from the shaft 7, and when this occurs the retardation upon the motor will cease permitting it to run faster under a less consumption of power. It will therefore be appreciated that the running temperature of the bearing metal can be readily obtained by watching the temperature at the thermometers 32 and also carefully watching the electrical power meters and the tachometer for the moment that the motor increases in speed and the power consumption drops, this of course being the moment that the bearing has run.

If it is desired to test the oil to a point when it permits the frictional temperature to materially rise, bearing blocks 21 of a known fusing point are used and the machine ran as before described until the oil film completely breaks down and permits such fusing temperature to be reached. The length of time until this occurs under the same running conditions is the comparative factor in making comparative oil tests with this method.

From the foregoing description, it will be apparent that I have designed a particularly simple form of machine for testing the frictional coefficiency of both lubricating oils and bearings and in which oil and bearing tests can be carried out during the same operation at a minimum of time and expense. Furthermore, by utilizing the electrical power supply meters in conjunction with the tachometer and thermometers as a reading means, I have devised a machine in which very accurate results may be obtained, and although I have shown and described a particular construction of my device, it is to be understood that I can make such changes as I may deem necessary without departing from the spirit of my invention as set forth in the appended claims.

I claim:

1. In a friction testing machine, the combination with a rotatable shaft and a plurality of blocks adapted to bear upon the shaft, of a strap surrounding the blocks for retaining them against the shaft, a cage in which the blocks are contained, a pivotal member mounted in the vicinity of the cage and to which one end of the strap is permanently secured and the other end adjustably secured, and adjustable means tending to swing the pivotal member away from the cage to exert a tension upon the strap.

2. In a friction testing machine, the combination with a rotatable shaft and a plurality of blocks adapted to bear upon the shaft, of a strap surrounding the blocks for retaining them against the shaft, means for retaining a tension upon the strap, a cage surrounding the shaft in the vicinity of one end thereof and in which the blocks are contained, means for detachably retaining and supporting the inner end of the cage, a pedestal structure slidably positioned in the vicinity of the outer end of the cage, and a shaft end bearing plate mounted upon said structure to enter the outer end of the cage to also constitute a support therefor.

3. In a friction testing machine, the combination with a rotatable shaft and a plurality of blocks adapted to bear upon the shaft, of a tensioning strap surrounding the blocks for retaining them against the shaft, a pair of spaced apart ring end plates surrounding the shaft, a plurality of equi-distantly spaced apart bars extending between the inner faces of the plates and constituting spaces in which the blocks are received, fixed means for retaining and supporting one of the said end plates, and moveable means for retaining and supporting the other end plate whereby the plate and bar structure may be removed from the shaft.

4. In a friction testing machine the combination with a rotatable shaft and a plurality of blocks adapted to bear against the shaft, of a strap surrounding the blocks for retaining them against the shaft, a pair of spaced apart ring end plates surrounding the shaft and having oil feed and oil drainage ducts therein, a plurality of equi-distantly spaced apart bars extending between inner faces of the plates and constituting spaces in which the blocks are received, a pivotal member mounted in the vicinity of the cage and to which one end of the strap is permanently secured and the other end adjustably secured, and adjustable means tending to swing the pivotal member away from the cage to exert a tension upon the strap.

5. A method of testing the co-efficient of friction of lubricants comprising the pressing of a metal friction block of a definitely known low fusing temperature in lubricated tensioned bearing upon a rotated member, cutting off the supply of lubricant to the bearing, and measuring the energy expended in rotating the member and the member's rotative speed at the time the supply of lubricant is cut off, and measuring the time from the oil cut off period to the time when the energy required to rotate the member becomes less and the rotative speed of the member becomes greater, due to the frictional heat generated; being sufficient, after the supply of oil is cut off, to fuse the bearing block and thus remove the bearing tension from the rotated member.

ADOLPH ALOYSIUS SCHAEFER.